United States Patent [19]
Edlund et al.

[11] Patent Number: 5,433,452
[45] Date of Patent: Jul. 18, 1995

[54] SEALING DEVICE

[75] Inventors: Roy Edlund; Holger Jordan, both of Leinfelden/Echterdingen; Rolf Poethig, Holzgerlinden, all of Germany

[73] Assignee: Busak + Luyken GmbH & Co., Stuttgart, Germany

[21] Appl. No.: 146,053

[22] PCT Filed: Apr. 15, 1992

[86] PCT No.: PCT/DE92/00318
   § 371 Date: Oct. 29, 1993
   § 102(e) Date: Oct. 29, 1993

[87] PCT Pub. No.: WO92/19893
   PCT Pub. Date: Nov. 12, 1992

[30] Foreign Application Priority Data

Apr. 30, 1991 [DE] Germany ............ 41 14 114.8
Dec. 11, 1991 [DE] Germany ............ 41 40 833.0

[51] Int. Cl.$^6$ ............................................. F16J 15/32
[52] U.S. Cl. ....................................... 277/165; 277/27; 277/177
[58] Field of Search ............ 277/165, 27, 173, 176, 277/177, 190, 168, 170

[56] References Cited

U.S. PATENT DOCUMENTS

| | | | |
|---|---|---|---|
| 3,909,016 | 9/1975 | Traub et al. | 277/165 |
| 4,911,455 | 3/1990 | Edlund | 277/176 |
| 4,917,390 | 4/1990 | Lee | 277/165 |
| 5,104,131 | 4/1992 | Edlund et al. | 277/27 |
| 5,249,813 | 10/1993 | Botto | 277/27 |

FOREIGN PATENT DOCUMENTS

| | | | |
|---|---|---|---|
| 0418732 | 3/1991 | European Pat. Off. | 277/165 |
| 2547387 | 12/1984 | France | F16J 15/56 |
| 1675910 | 3/1973 | Germany | F16J 15/54 |
| 2325000 | 12/1974 | Germany | F16J 9/08 |
| 2458529 | 7/1975 | Germany | F16J 15/32 |
| 3026063 | 2/1982 | Germany | F16J 9/06 |
| 3521525 | 11/1986 | Germany | F16J 15/16 |
| 3743726 | 4/1989 | Germany | F16J 15/56 |
| 3828692 | 3/1990 | Germany | F16J 15/16 |
| 3835505 | 5/1990 | Germany | F16J 15/16 |
| 1093530 | 12/1967 | United Kingdom | 277/29 |
| 1438619 | 6/1976 | United Kingdom | 277/165 |
| 2124717 | 2/1984 | United Kingdom | F16J 15/24 |
| WO89/12191 | 12/1989 | WIPO | F16J 15/32 |
| WO91/04430 | 4/1991 | WIPO | F16J 15/32 |

*Primary Examiner*—Daniel G. DePumpo
*Attorney, Agent, or Firm*—Flynn, Thiel, Boutell & Tanis

[57] ABSTRACT

A sealing device is arranged in a groove between a first machine component and a second machine component. If the sealing device, comprising the sealing ring and the biasing element, is subjected to a hydraulic pressure from the high pressure side and/or should an axial motion of a machine component take place, the sealing ring pivots towards the low pressure side in such a fashion that an angle α is reduced and an angle β is increased. Through this pivoting effect a sealing edge is formed. Thereby a wedge-shaped gap forms between the peripheral surface and the surface of the sealing ring lying across therefrom, the gap being open towards the low pressure side.

21 Claims, 6 Drawing Sheets

SEALING DEVICE

FIELD OF THE INVENTION

The invention concerns a sealing device between two concentric machine components which are movable with respect to each other, with a first sealing ring made from tough elastic plastic and with a biasing element made from a resilient elastic material which radially biases the sealing ring, whereby the first machine component exhibits a groove which accepts the sealing ring and the biasing element and whereby the sealing ring lies on a peripheral surface of the second machine component.

BACKGROUND OF THE INVENTION

A sealing device of this kind has become known through DE-AS 23 25 000.

The known sealing device is characterised by an extremely small leak rate and a very long lifetime. Occasionally, however, elevated leak rates have been observed.

The underlying purpose of the invention is therefore to improve the sealing effect of the known sealing device and to increase its lifetime.

This purpose is achieved in accordance with the invention in that, in the pressure-less state, the sealing ring, as viewed in the radial direction with respect to the axis of the second machine component, is at least partially separated from a low pressure side of the groove, in that the sealing ring is pivotable towards the low pressure side under the application of pressure and/or through the frictional force between the sealing ring and the peripheral surface, and in that the sealing ring forms a sealing edge with respect to the peripheral surface.

The sealing device in accordance with the invention thereby has the essential advantage that it can be mounted without a prominent sealing edge. The cross-sectional shapes of this type of sealing ring can be simple since pressure loaded and unloaded surfaces can adjust themselves relative to the sealing edge in accordance with the degree of pivot of the sealing ring from the pressure-less into the pressure-loaded state.

If the sealing device is utilized in the pressure-less state and for machine components which move back and forth with respect to each other, the sealing ring pivots from an installed position into a working position in such a fashion that it always tilts on the groove edge, formed on the stationary machine component, which is opposite to the direction of motion of the moving machine component. The low pressure side N corresponds in this case to the side to which the sealing ring is pivoted.

The sealing ring in accordance with the invention is biased by means of a biasing element and its surfaces directed towards the groove sides form an acute angle therewith which in a pressure-less state lies between 10° and 40°.

If the sealing ring is symmetrically constructed, it is also easy to mount since attention must not be paid to the direction of installation. The sealing ring, in the case of symmetric configurations, can be subjected, in a direction independent fashion, to a hydraulic pressure in such a fashion that the pivoting process in accordance with the invention establishes itself.

The particularly advantageous application of the sealing configuration according to the invention as a shaft and piston seal has been confirmed by long-running experiments. The durability is substantially increased compared to known sealing devices for reduced leak rates.

If the sealing ring is manufactured from polytetrafluoroethylene, a sealing ring which is symmetric in the pressure-less state can be formed into an asymmetric sealing ring in the pressure-loaded state. Thereby the sealing ring material flows into free spaces given by diagonal surfaces, the free spaces establishing themselves due to the pivoting of the machine component in the groove.

Sealing rings made from polyurethane are particularly suitable for piston seals because they can be subjected to alternating pressure from different directions and also exhibit a very stable shape when pressure-loaded. The sealing device in accordance with the invention is also applicable as a rotational seal. Towards this end a rotational movement with the moving mechanical parts is compensated for by a large area seating of the sealing ring on the low pressure side of the groove.

The sealing configuration according to the invention is also applicable as a shaft seal in a pressure-less state. The pivoting motion into the working position takes place via friction between the sealing edge and the surrounding area which is to be sealed.

Clearly, the groove sides lying across from the oppositely positioned front surfaces of the sealing ring can be tilted in the pressure-less state. The front sides of the inventive sealing ring which face the sides of the grooves can also exhibit differing tilts or could be continuously deformed. If the groove sides of the first machine part are tilted with respect to a plane through the symmetry axis of the second machine part the sealing ring in accordance with the invention can exhibit a particularly simple cross-sectional shape. In a preferred configuration, the sealing ring in accordance with the invention is symmetric to a plane which is perpendicular to the plane through the symmetry axis of the second machine part. This simplifies the production of a sealing ring of this type and the sealing ring according to the invention can be simply and easily utilized for applications with which a change in pressure takes place from one groove side to the other.

In further configurations of the invention the first and second sealing ring areas are tilted relative to the symmetry axis and configured in a parallel fashion and the groove sides of the first machine part are at right angles to the symmetry axis. This has the advantage that the sealing ring, due to the wedge angle between the peripheral area and the seating area exhibits a prominent pressing maximum in the vicinity of the sealing edge and allows for a reverse transport of the fluid present at the actual low pressure side N.

Further advantages can be derived from the description of the accompanying drawing. Likewise the characterising features which were mentioned above and those which will be further described below in accordance with the invention can be utilized individually or in arbitrary mutual combination. The suggested embodiments are not to be interpreted as sole enumerations, rather have exemplary character.

3

BRIEF DESCRIPTION OF THE DRAWINGS

The invention is represented in the drawing and will be further described in connection with the embodiments.

Figure 1:
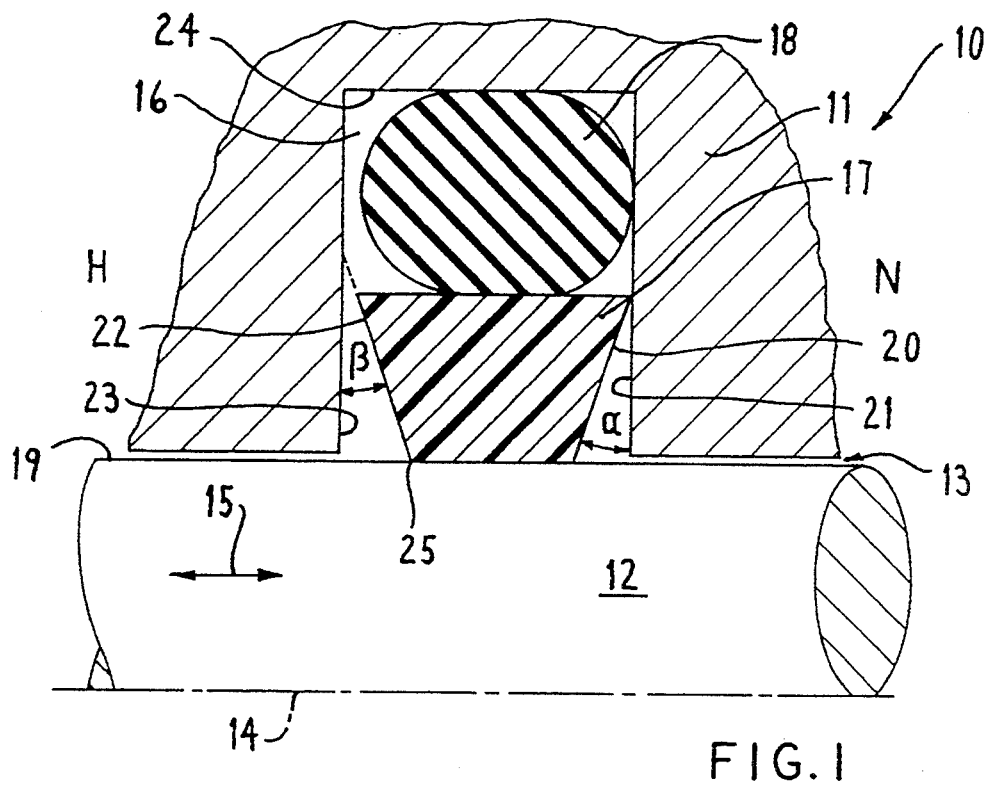
FIG. 1 shows a sealing configuration in accordance with the invention in the pressure-less state with a trapezoidal shaped cross section of the sealing ring.

The individual figures of the drawing are, in part, largely schematizied representations of the object of the invention and are not to be taken to scale. The objects of the individual figures are, in part, enlarged so that the construction can be more easily depicted.

DETAILED DESCRIPTION

FIG. 1 shows a sealing configuration 10 with a first machine component 11 and a second machine component 12. The sealing device 10 seals a gap 13 between the machine components 11, 12. The second machine component 12 can rotate about an axis 14 whereas the first machine component 11 [s arranged fixed in space. In a further embodiment the second machine component 12 moves in the direction of the arrow 15 and the first machine component 11 is stationary. The sealing configuration 10 can also be applied in the opposite motional sense of the machine components 11, 12 with which the second machine component 12 is stationary and the first machine component 11 moves. Towards this end the first machine component 11 can exercise a rotational motion relative to the axis 14 or an axial motion along the axis 14.

The sealing configuration 10 is represented in FIG. 1 in the pressure-less state. A sealing ring 17 made from a tough-elastic material, preferentially from polytetrafluoroethylene or from polyurethane, and a biasing element 18 made from a rubber-elastic material are arranged in a groove 16 of the first machine component 11. The pre-stressing component 18 is preferentially an O-ring or a four-surfaced sealing ring. Depending on the requirements, in the pressure-less state, the biasing element 18 presses the sealing device 10 of the sealing ring 17 more or less strongly with a predetermined force against a peripheral surface 19 or the second machine component 12.

The sealing ring 17, in the embodiment of FIG. 1, exhibits a trapezoidal shaped cross section. The sealing ring 17 forms, with a first sealing ring surface 20 which is radially directed with respect to the axis 14, an angle $\alpha$ with a low-pressure side 21 of the groove 16. The wedge gap which thereby results opens towards the peripheral surface 19. An angle $\beta$ results between a second sealing ring surface 22 and a high pressure side 23 of the groove 16. The region spanning the angle $\beta$ is extended with a broken line up to the high pressure side 23 of the groove in the figure. In the pressure-less state the sealing device exhibits angles $\alpha$, $\beta$ between 10° and 40°.

H indicates the high pressure side and N the low pressure side in the figure. The biasing element 18 is supported in the figure at the bottom of the groove 24.

When the sealing device 10 of FIG. 1 is subjected to pressure the sealing ring 17 pivots in such a fashion that the angle $\alpha$ is reduced and the angle $\beta$ is increased. Thereby a sealing edge 25 is formed on the side of the sealing ring 17 directed towards the peripheral surface 19.

Figure 2:
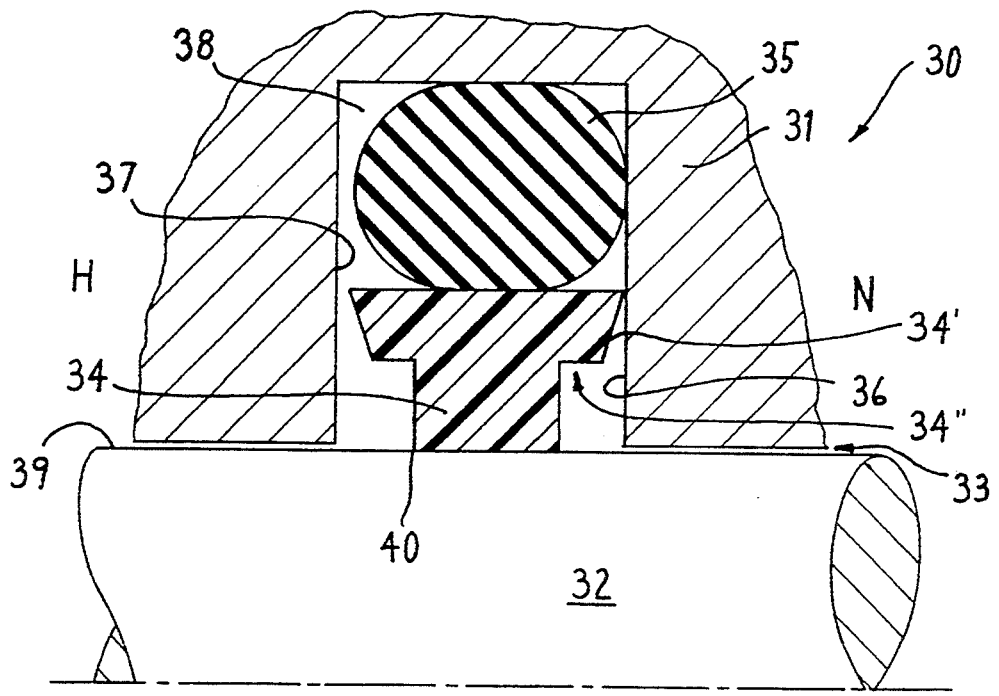
FIG. 2 shows a further embodiment of a sealing configuration according to the invention with a T-shaped cross section of the sealing ring.

FIG. 2 shows a further embodiment of a sealing device 30 between a first machine component 31 and a second machine component 32. With the sealing device 30 a gap 33 is sealed between the machine components 31, 32. The sealing device 30 consists of a sealing ring 34 with a T-shaped cross-section and a biasing element 35. When no hydraulic pressure is exercised on the sealing device 30 from the high pressure side H, the sealing device 30 can exhibit the cross sectional shape shown in FIG. 2. In this connection the sealing ring 34 as well as the biasing element 35 can be located at a separation from the sides 36, 37 of the groove 38. A sealing ring surface 34' borders on a step 34'' which, similar to the sealing ring surface 34 itself, lies across from the groove side 36. When subjected to hydraulic pressure load, the sealing device drifts to the extent that it rests initially against the low-pressure side 36 of the groove 38 and subsequently pivots (counterclockwise in FIG. 2) into an operational position. Thereby a sealing edge 40 forms on a peripheral surface 39. Between the peripheral surface 39 and the diametrical sealing ring 34 surface opposite thereto a wedge gap opens up on the low-pressure side N.

Both the sealing ring 17 of FIG. 1 as well as the sealing ring 34 of FIG. 2 are configured symmetrically in the pressure-less state.

Figure 3A:
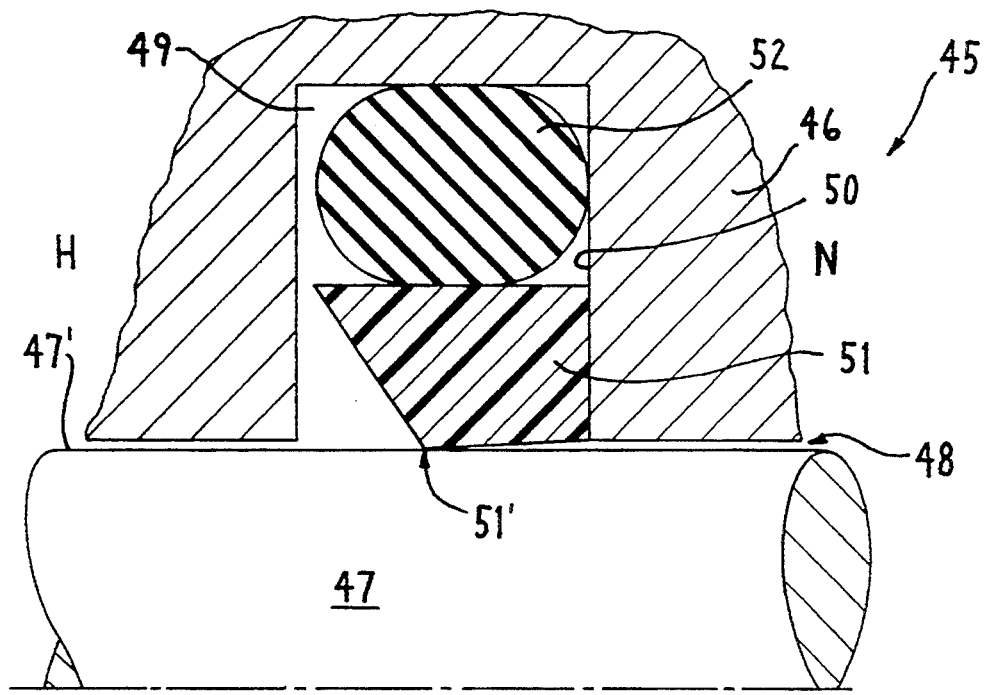
FIG. 3a and FIG. 3b show a sealing configuration according to the invention subjected to pressure from different directions.
Figure 3B:
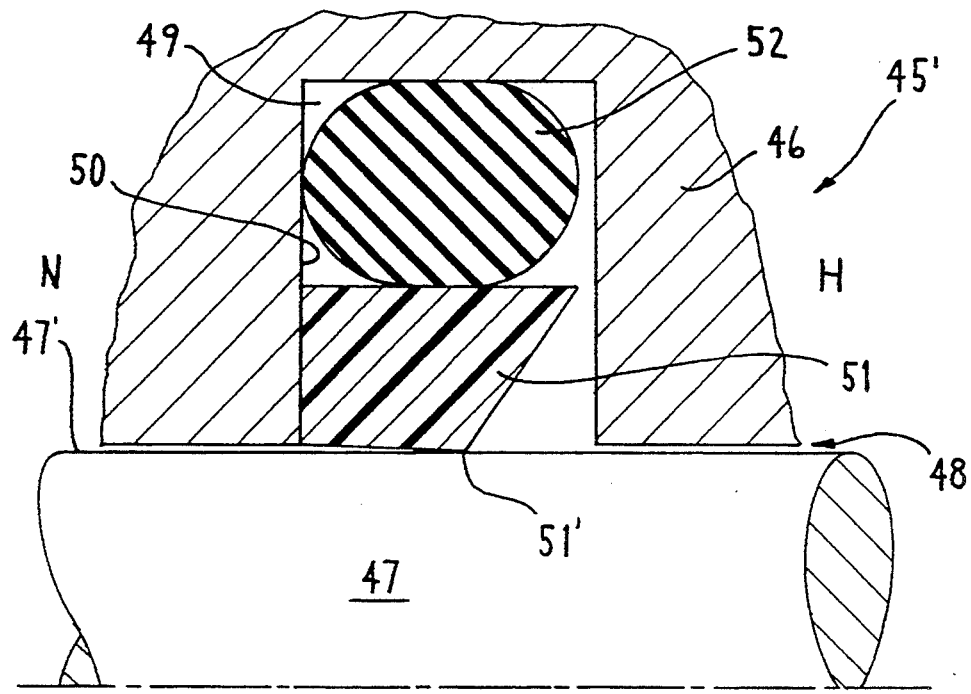

FIGS. 3a and 3b show a sealing device 45, 45' which is subjected to a hydraulic pressure from the high pressure side H. A first machine component 46 is separated from a second machine component 47 so that a gap 48 occurs. This gap 48 is sealed via the sealing device 45, 45'. The hydraulic pressure in FIGS. 3a and 3b is directed onto the sealing device 45, 45' from differing directions. The sealing device 45, 45', depending on the direction of the hydraulic pressure, shifts within a groove 49 of the first machine component 46 until it comes to rest on a low-pressure side 50 of the groove. The sealing ring 51 is pivoted in the operating position, so that it comes to rest on the side 50 of the groove with that surface which, in the pressure-less state, is directed at an angle with respect to the groove side 50, and which, under hydraulic pressure lies with its entire surface on the groove side 50. The sealing ring 51 is biased via a biasing element 52 which is supported on the groove bottom 53. A sealing edge 51' is formed opposite a peripheral surface 47'.

Figure 4:
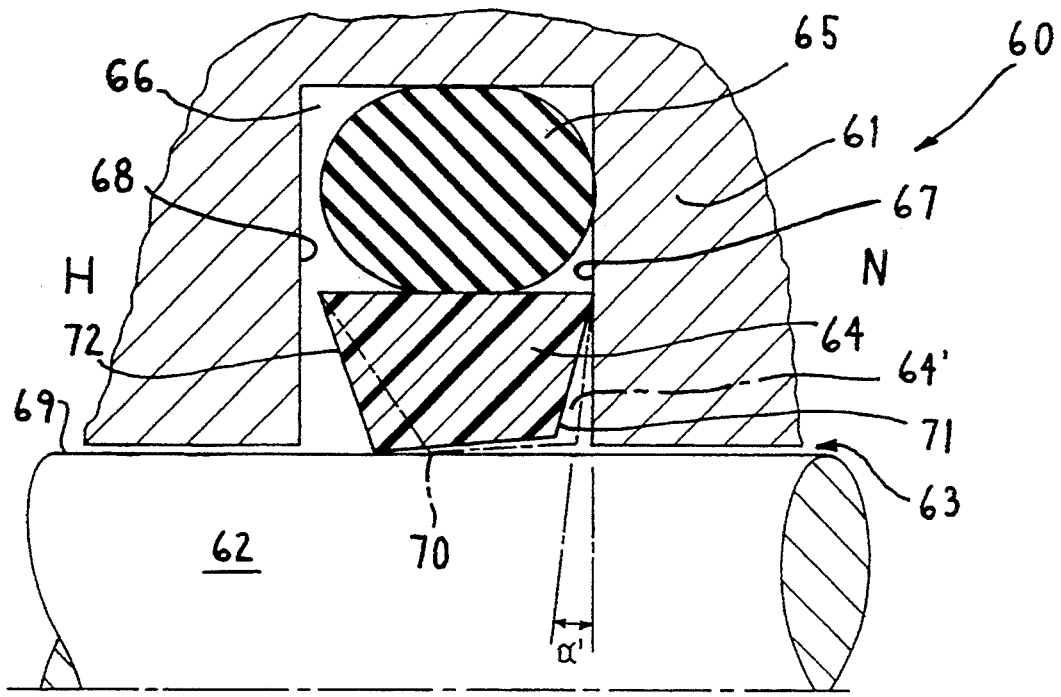
FIG. 4 shows a sealing configuration with a sealing ring which has an asymmetric cross section in both the pressure-less as well as the pressure-loaded states.

FIG. 4 shows a further sealing device 60 between a first machine component 61 and a second machine component 62. A gap 63 is sealed via an asymmetrically configured sealing ring 64, 64' and via a biasing element 65. The sealing ring 64 indicated by solid lines in the groove 66 of the first machine component 61 is, in the pressure-less state, only under bias via the biasing element 65. The dash-dotted lines indicate the sealing ring 64' under the influence of hydraulic pressure from the high-pressure side H. In the pressurized state the sealing ring 64, 64' and the biasing element 65 are not only supported by the how-pressure side 67 of the groove, but the sealing ring 64' seats over an enlarged surface section on the groove side 67. The sealing ring 64' and the biasing element 65 are, during operation, separate from a groove side 68. In the operating position, a sealing edge 70 which is formed around the peripheral surface 69, the seats in a ring-shaped fashion on the peripheral surface 69.

The surface of the sealing ring 64, 64' lying opposite from the peripheral surface 69 forms a wedge gap with the peripheral surface 69, the gap opening towards the low-pressure side N. In the operating position an angle $\alpha'$ remains between the low-pressure side 67 of the groove and the sealing ring surface 71 and is directed radially towards the surface 69. In this fashion it is possible for the sealing device 60 to adjust its sealing edge 70 in response to wear. The angles which establish themselves between the groove sides 67, 68 and the sealing ring surfaces 71, 72, are different in the pressure-less and pressurized states.

Figure 5:
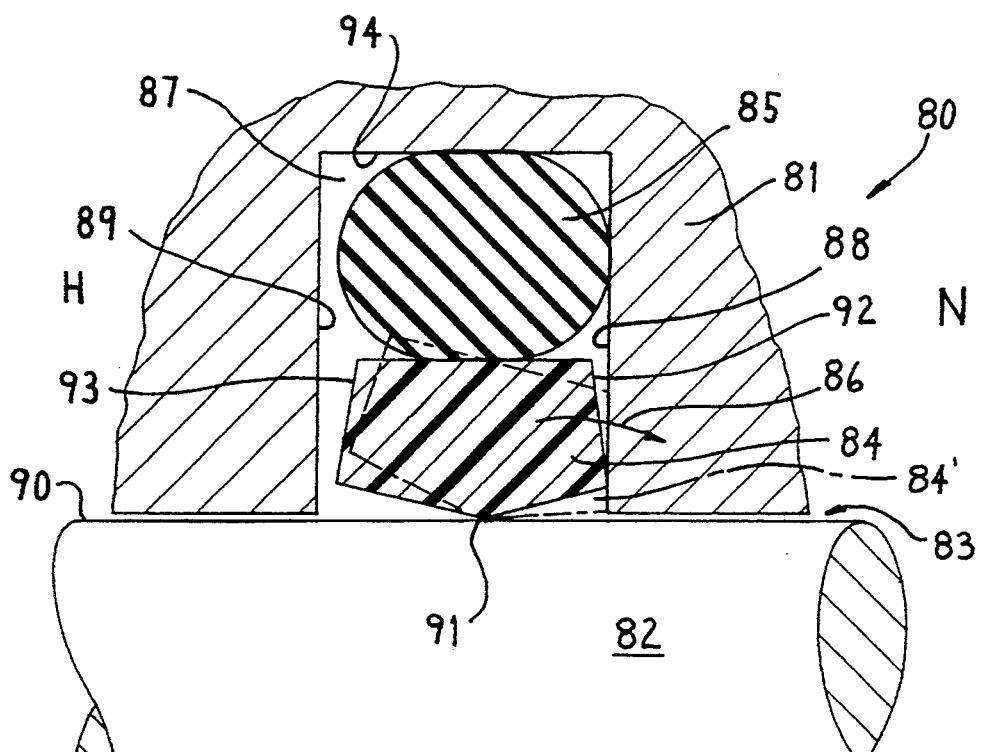
FIG. 5 shows a further embodiment of a sealing configuration according to the invention with a symmetric sealing ring which can be pivoted about a sealing edge from a pressure-less state into an operation state which is pressure loaded.

FIG. 5 shows a sealing device 80 between two machine components 81, 82. A gap 83 between the machine components 81, 82 is sealed via the sealing device 80. The sealing device 80 consists of a biasing element 85 and a sealing ring 84 as shown in the pressure-less state, or as shown at 84' in the pressurized state. Under the influence of hydraulic pressure from the high-pressure side H, the sealing ring 84 pivots in the direction of the arrow 86 into the position indicated by the dot-dashed lines in FIG. 5. The sealing ring 84' seats in a groove 87 of the first machine component 81 and, in the pressurized state, seats against the low-pressure side 88 of the groove and is separated from the high-pressure groove side 89. The sealing ring 84, 84' forms together with a peripheral surface 90 of the second machine component 82, in both pressure-less and pressurized states, a wedge-shaped groove opening towards the high-pressure as well as the low-pressure sides. The point of rotation about which the sealing ring 84, 84' can pivot lies at a sealing edge 91. In the pressure-less state the sealing ring surfaces 92, 93 form angles with respect to the groove sides 88, 89 which open towards the groove bottom 94.

Figure 6:
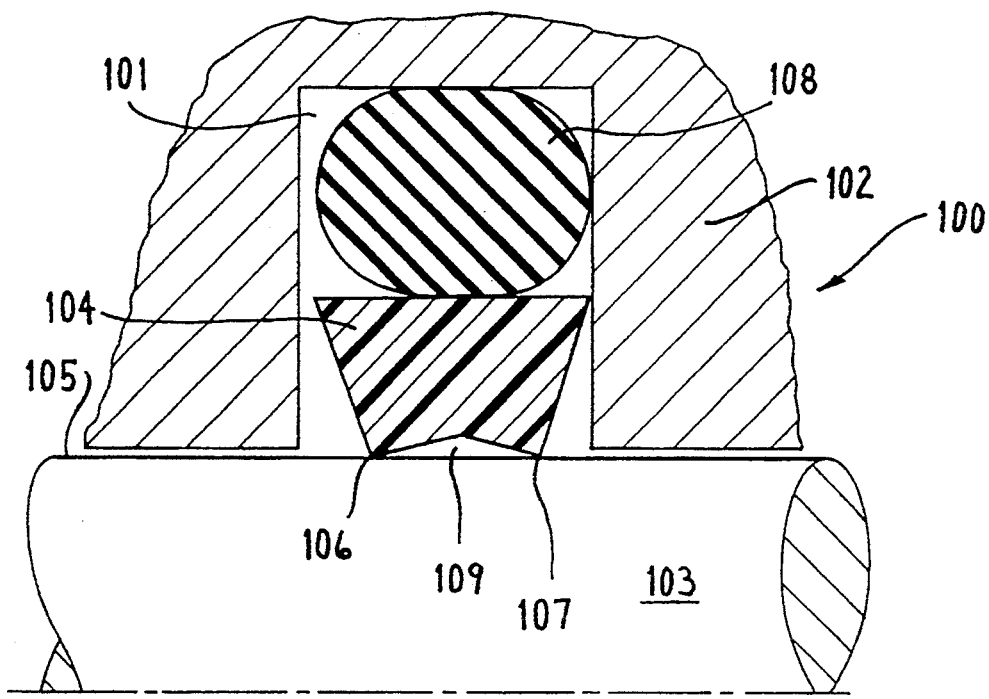
FIG. 6 shows an embodiment of a sealing configuration according to the invention with two sealing edges in the pressure-less state and one sealing edge in the pressure-loaded state.

FIG. 6 shows a further embodiment of a sealing device 100 as held in a groove 101 of a first machine component 102. A sealing ring 104 thereby forms, in the pressure-less state, two sealing edges 106, 107 with respect to a peripheral surface 105, the edges being biased to press against the peripheral surface 105 by means of a biasing element 108. In the pressurized state the sealing ring 104 tilts in such a fashion that one of the two sealing edges 106, 107 is lifted away from the peripheral surface 105. The sealing edges 106, 107 of the sealing ring 104 are shaped in such a manner that a gap with a triangular cross section 109 is formed between the sealing edges 106, 107. Since the sealing ring 104 is symmetrically configured, the sealing configuration 100 can be subject to pressure from alternate sides.

Figure 7:
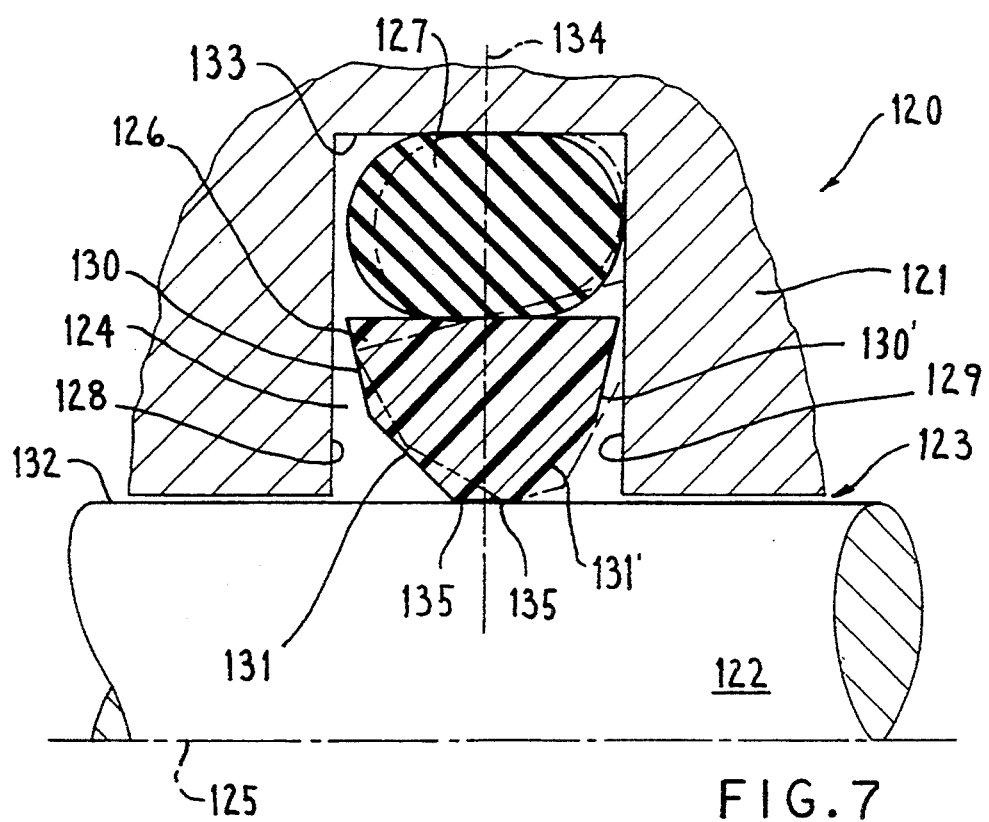
FIGS. 7, 8 and 9 show further embodiments of a sealing configuration in accordance with the invention with the installation positions shown in the pressure-less as well as in the pressure-loaded state

FIG. 7 shows an embodiment of a sealing device 120 in accordance with the invention between a first machine component 121 and a second machine component 122 whereby the machine components 121, 122 are separated from another by means of a gap 123. The sealing device is built into a groove 124. The first and the second machine components 121, 122 are concentric to a first axis 125. A sealing ring 126, made from a rough-elastic material, and a biasing element 127, made from a resilient elastic material, are arranged in the groove 124. The groove sides are designated as 128, 129 in the figure. Facing the groove sides 128, 129 are a first front side 130, 130' and a second front side 131, 131'. The first front side 130, 130' is at an angle with respect to the second front side 131, 131'. The first/front side 130, 130' and the second front side 131, 131' are tilted to differing degrees relative to a peripheral surface 132 of the second machine component 122. The biasing element 127 presses the sealing ring 126 against the peripheral surface 132 with a predetermined bias Thereby, the biasing element 127 is supported at the bottom 133 of the groove 124. In the figure, the sealing ring 126, in the pressure-less state, is symmetric with respect to a plane which runs through a second axis 134. The plane running through the second axis 134 extends perpendicular to the plane which runs through the first axis 125. In the pressure-less state the sealing ring 126 forms a ring-shaped sealing edge surface 135 with which it is pressed against the peripheral surface 132 in a sealing and biased fashion.

If pressure is applied to the sealing device 120, the sealing ring 126 pivots into a position indicated by the dot-dashed lines in FIG. 7. The biasing element 127 assumes, in the pressurized state, a position exemplified by the dotted lines in the figure. Due to the varying relationship between the front sides 130, 130' and 131, 131' it is possible to predefine sealing device pivoting angles of differing magnitudes between the pressurized and the unpressurized states and likewise it is possible to pressure-load relieve the sealing edge in the pressurized state of the sealing ring to a greater or lesser degree.

Figure 8:
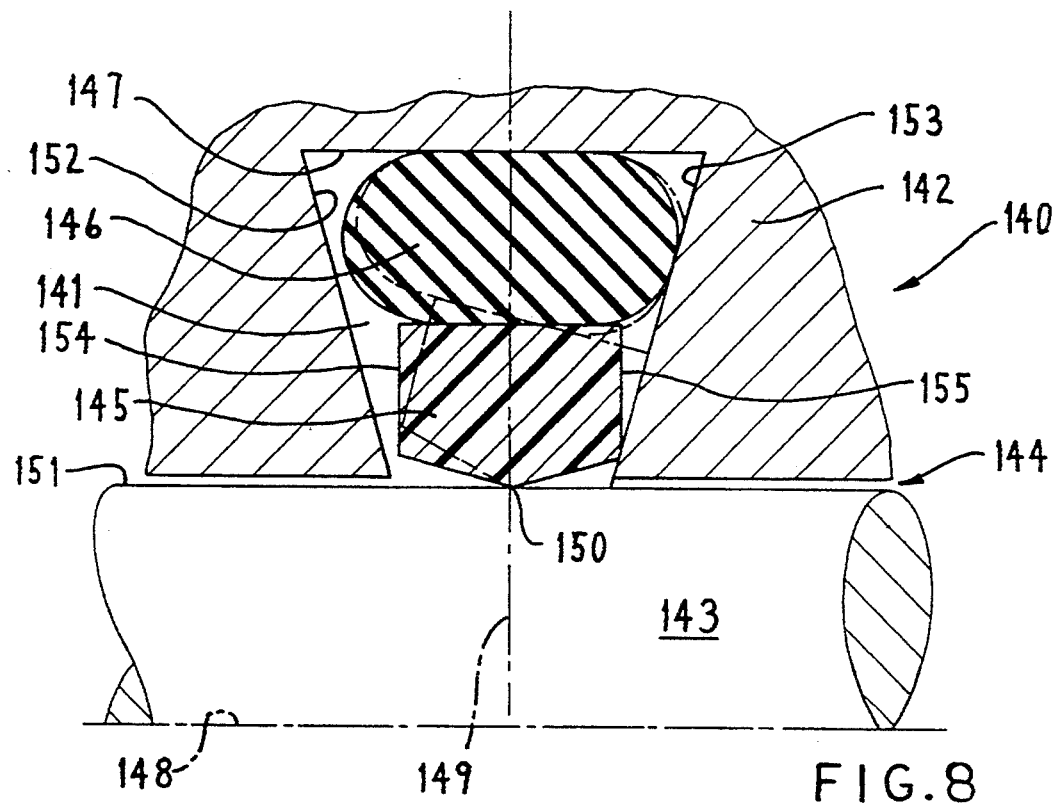

FIG. 8 shows a further embodiment of the sealing device 140 configured within a groove having a dovetail-shaped cross section 141. The groove 141 is formed in a first machine component 142 and the groove 141 opens towards a second machine component 143. A gap 144 is formed between the first machine component 142 and the second machine component 143 which is sealed via the sealing device 140. The sealing device 140 is formed from a sealing ring 145 and a biasing element 146 which is supported on the groove bottom 147. The machine components 142, 143 are symmetrically configured with respect to a first axis 148. The first axis 148 crosses a second axis 149 defining a plane about which the sealing ring 145 is symmetrically configured in the pressure-less state. By means of a sealing edge 150 which, in both the pressure-less as well as in the pressurized states of the sealing ring 145, seats linearly upon a peripheral surface 151 of the second machine component 143, a pressing maximum is achieved at this location. If a first groove side 152 and a second groove side 153 are configured at an angle relative to the plane through the second axis 149, it is thereby possible to configure the front sides 154, 155 of the sealing ring 145 to run parallel to the plane of the second axis 149.

In the pressurized state, the sealing device 140 tilts into a position indicated by the dot-dashed lines in the figure. The sealing device 140 thereby seats over an area on the low-pressure side 153 of the groove and is separated from the first groove side 152.

Figure 9:
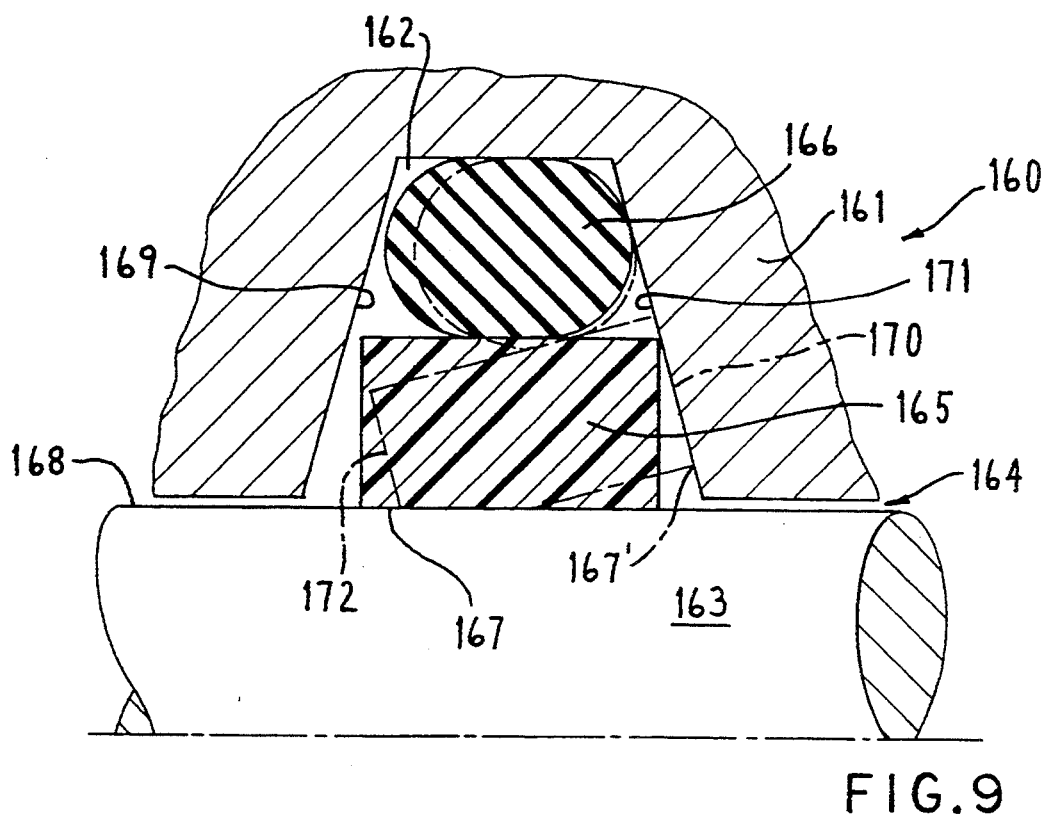

A further embodiment of a sealing device 160 according to the invention is shown in FIG. 9. A groove 162 with a trapezoidal shaped cross section is cut into a first machine component 161, the groove accepting the sealing device 160. The groove 162 opens towards a second machine component 163. The machine components 161, 163 are separated from each other by a gap 164. The sealing device 160 consists of a sealing ring 165 with a rectangular shaped cross section and made from tough-elastic material as well as a biasing element 166 with a ring or oval-shaped cross section. In the pressure-less state of the sealing device, the sealing ring 165 forms a sealing edge 167 over a certain surface area, the edge seating on a peripheral surface 168 of the second machine component 163.

In the pressurized state, the sealing device 160 is, so long as the high-pressure medium is present at a first groove side 169, tilted away from the groove side 169 and the sealing ring 165 seats, via a front side 170, over an area on a second groove side 171. The pressurized installation position of the sealing device 160 is indicated in the figure with dot-dashed lines.

The high pressure medium can also act on the second groove side 171 via the gap 164. In this case the sealing device 160 displaces itself towards the first groove side 169 and the sealing ring 165, via a second front side 172, thereby seats over an area on the first groove side 169. The pressing maximum thereby lies in a line-shaped sealing edge 167' lying across from the sealing edge 167.

By means of various cross-sectional forms of the biasing element, for example four edged sealing rings, it is possible to influence the pressing distribution in the pressure-less as well as in the pressurized state of the sealing device 160 in a defined fashion.

Figure 10:
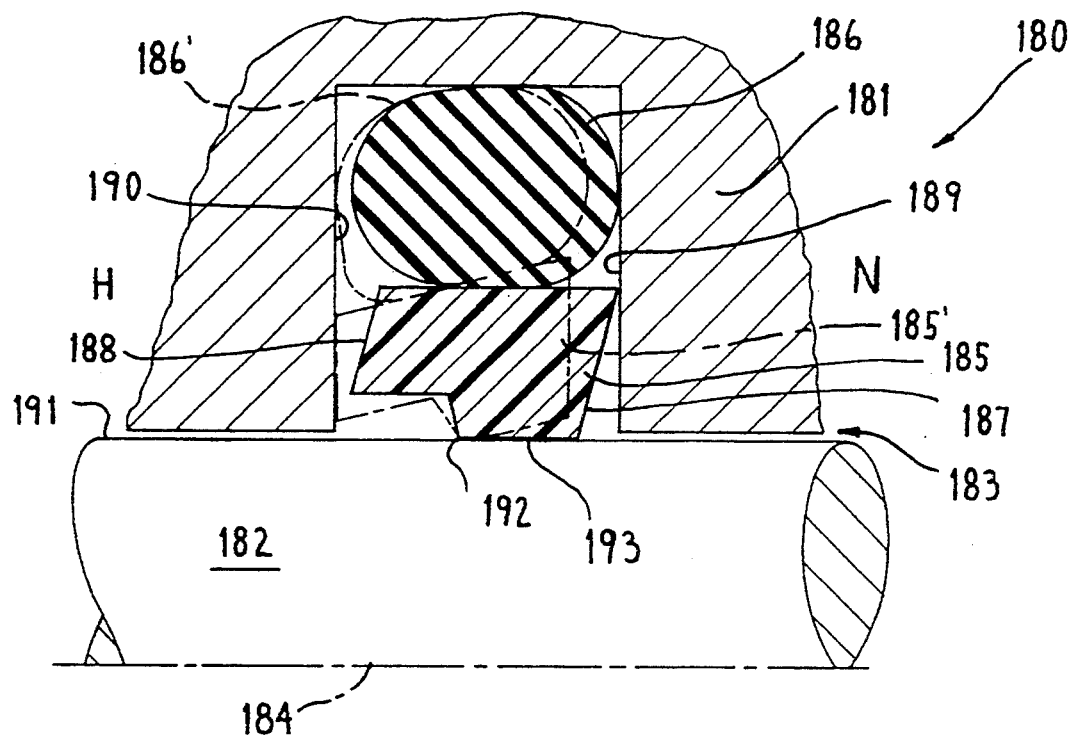
FIG. 10 shows a cross section of a further embodiment of the sealing configuration in accordance with the invention with sealing ring surfaces which are parallel and tilted with respect to the symmetry axis of the second machine part, the sealing ring surfaces lying at right angles opposite to the groove sides aligned with the symmetry axis.

FIG. 10 shows a sealing device 180 with a first machine component 181 and a second machine component 182. The machine components 181, 182 are separated from another. In this fashion a gap 183 is formed. The machine components 181, 182 are configured concentric to the symmetry axis 184.

The gap 183 is sealed by the sealing device 180. The sealing device 180 consists of a sealing ring 185 and a biasing element 186 in the pressure-less state and in the, from the actual low-pressure side N, pressurized state is formed from a sealing ring 185' and a biasing element 186'.

The sealing ring 185, 185' exhibits a first sealing ring surface 187 and a second sealing ring surface 188 which are parallel and tilted with respect to the symmetry axis 184.

In the pressure-less state the sealing ring 185 is in contact with a first groove side 189 and is separated from a second groove side 190. In the pressurized state, from the actual low-pressure side N, the sealing ring 185' is separated from the first groove side 189 and seats over an area on the second groove side 190. In the pressure-less state, the sealing ring 185 seats, over a surface area, on a peripheral surface 191 of the second machine components 182. In the pressurized state from the actual low-pressure side N, the sealing ring 185' pivots into the position shown in the figure to thereby form a ring-shaped sealing edge 192. In the pressure-less state a seating surface 193 of the sealing ring 185 is, in the pressurized state, separated from a peripheral surface 191, forming a wedge angle opening towards the low pressure side N. The opening angle between the seating surface 193 and the peripheral surface 191 can be chosen sufficiently large that a fluid can be dragged by means of a back and forth motion of the machine components 181, 182 from the actual low-pressure region N into the high-pressure region H. This is also possible when drag forces or intermediate pressures are present in the low pressure region N which are larger than the operational pressure on the high-pressure side H. In the sealing device according to FIG. 10 the sealing ring 185, 185' exhibits only one sealing edge 192 and this is independent of the pivotal direction or the pressuring of the sealing ring 185, 185'. The sealing edge 192 is always arranged at one and the same position.

A sealing device 10 is arranged in a groove 16 between a first machine component 11 and a second machine component 12. Should the sealing device 10, comprising the sealing ring 17 and the biasing element 18 be subject to a hydraulic pressure from the high pressure side H and/or should an axial motion of the machine component 11, 12, take place, the sealing ring 17 pivots towards the low pressure side N in such a fashion that the angle $\alpha$ is reduced and the angle $\beta$ is enlarged. In this pivoting action the sealing edge 25 is formed. In this fashion a wedge gap occurs between the peripheral surface 19 and the surface of the sealing ring 17 lying across therefrom which opens towards the low pressure side N.

We claim:

1. A sealing device to seal between first and second machine components, the two machine components being concentric and moving back and forth with respect to each other, the sealing device comprising a sealing ring made from a tough-elastic plastic and a biasing ring radially biasing the sealing ring and made from a resilient elastic material, the first machine component exhibiting a groove to accept the sealing ring and the biasing ring and, in a pressure-less state, the sealing ring seats on a peripheral surface of the second machine component to form a sealing surface and, as seen in a radial direction relative to an axis of the second machine component, is at least partially separated from a low-pressure side of the groove; wherein the sealing ring, under the application of pressure tilts toward the low-pressure groove side to seat on the low-pressure side of the groove and form a sealing edge engaged with the peripheral surfaces; wherein in the pressure-less state at least one of first and second sealing ring sides as defined on said seal ring forms an acute angle with an opposed side of the groove, which said angle opens toward the peripheral surface; and wherein the sealing ring in a pressurized state cooperates with the peripheral surface to form a wedge-shaped gap therebetween which opens toward the low-pressure side of the groove.

2. The sealing device of claim 1, wherein, in the pressure-less state, the low-pressure side of the groove forms an acute angle $\alpha$ with the first sealing ring side.

3. The sealing device of claim 2, wherein the first sealing ring side has a step.

4. The sealing device of claim 2, wherein the acute angle $\alpha$ is an angle between 10° and 30°.

5. The sealing device of claim 1, wherein the sealing ring is symmetrically configured in the pressure-less state.

6. The sealing device of claim 1, wherein the sealing ring is manufactured from the material polytetrafluoroethylene.

7. The sealing device of claim 1, wherein the sealing ring is manufactured from the material polyurethane.

8. The sealing device of claim 1, wherein, in the pressure-less state, the high-pressure side of the groove forms an acute angle $\beta$ with the second sealing ring side.

9. The sealing device of claim 7, wherein the acute angle $\beta$ is an angle between 20° and 40°.

10. A sealing device to seal between first and second machine components, the two machine components being concentric and rotating with respect to each other, the sealing device comprising a sealing ring made from a tough plastic and a biasing ring radially biasing the sealing ring and made from a resilient elastic material, the first machine component exhibiting a groove to accept the sealing ring and the biasing ring and, in a pressure-less state, the sealing ring seats, to form a sealing surface, on a peripheral surface of the second machine component, and, as seen in a radial direction with respect to an axis of the second machine component, is at least partially separated from a low-pressure side of the groove, wherein the sealing ring, under the application of pressure, pivots towards the low-pressure groove side to seat on the low-pressure side of the groove and form a sealing edge engaged with the peripheral surface; wherein in the pressure-less state at least one of first and second sealing ring sides as defined on said seal ring forms an acute angle with an opposed side of the groove, which said angle opens toward the peripheral surface; and wherein the sealing ring in a pressurized state cooperates with the peripheral surface to form a wedge-shaped therebetween which opens toward the low-pressure side of the groove.

11. The sealing device of claim 10, wherein, in the pressure-less state, the low-pressure side of the groove forms an acute angle $\alpha$ with the first sealing ring side.

12. The sealing device of claim 11, wherein the first sealing ring side has a step.

13. The sealing device of claim 11, wherein the acute angle $\alpha$ is an angle between 10° and 30°.

14. The sealing device of claim 10, wherein the sealing ring is symmetrically configured in the pressure-less state.

15. The sealing device of claim 10, wherein the sealing ring is manufactured from the material polytetrafluoroethylene.

16. The sealing device of claim 10, wherein the sealing ring is manufactured from the material polyurethane.

17. The sealing device of claim 10, wherein, in the pressure-less state, the high-pressure side of the groove forms an acute angle $\beta$ with the second sealing ring side.

18. The sealing device of claim 17, wherein the acute angle $\beta$ is an angle between 20° and 40°.

19. The sealing device of claim 18, wherein the seal ring has an outer annular surface which is generally flat in the axial direction and, in a pressure-less state, extends generally parallel with a flat bottom wall of said groove, and wherein said biasing ring is radially compressed between the bottom wall of the groove and the outer annular wall of said sealing ring.

20. The sealing device of claim 1, wherein the seal ring has an outer annular surface which is generally flat in the axial direction and, in a pressure-less state, extends generally parallel with a flat bottom wall of said groove, and wherein said biasing ring is radially compressed between the bottom wall of the groove and the outer annular wall of said sealing ring.

21. A sealing device to seal between first and second machine components, the two machine components being concentric and moving back and forth with respect to each other, the sealing device comprising a sealing ring made from a tough-elastic plastic and a biasing ring radially biasing the sealing ring and made from a resilient elastic material, the first machine component exhibiting a groove to accept the sealing ring and the biasing ring and, in a stationary state, the sealing ring seats on a peripheral surface of the second machine component to form a sealing surface and, as seen in a radial direction relative to axis of the second machine component, is at least partially separated from a low-pressure side of the groove; wherein the sealing ring, under the application of frictional force between the sealing ring and the peripheral surface, tilts toward the low-pressure groove side to seat on the low-pressure side of the groove and form a sealing edge engaged with the peripheral surface; wherein in the stationary state at least one of a first and a second sealing ring side as defined on said seal ring forms an acute angle with an opposed side of the groove, which said angle opens toward the peripheral surface; and wherein the sealing ring, in a frictionally forced state, cooperates with the peripheral surface to form a wedge-shaped gap therebetween which opens toward the low-pressure side of the groove.

* * * * *

UNITED STATES PATENT AND TRADEMARK OFFICE
CERTIFICATE OF CORRECTION

PATENT NO. : 5 433 452
DATED : July 18, 1995
INVENTOR(S) : Roy Edlund et al

It is certified that error appears in the above-indentified patent and that said Letters Patent is hereby corrected as shown below:

On the title page, [75] Inventors, line 3;
    change "Holzgerlinden" to ---Holzgerlingen---.

Column 9, line 13; change "claim 7," to ---claim 8,---.

Signed and Sealed this

Seventeenth Day of October, 1995

*Attest:*

BRUCE LEHMAN

*Attesting Officer*         *Commissioner of Patents and Trademarks*

REEXAMINATION CERTIFICATE (4382nd)

United States Patent
Edlund et al.

(10) Number: US 5,433,452 C1
(45) Certificate Issued: Jun. 26, 2001

(54) SEALING DEVICE

(75) Inventors: Roy Edlund; Holger Jordan, both of Leinfelden/Echterdingen; Rolf Poethig, Holzgerlingen, all of (DE)

(73) Assignee: Busak + Shamban GmbH & Co., Stuttgart (DE)

Reexamination Request:
No. 90/005,723, May 12, 2000

Reexamination Certificate for:
Patent No.: 5,433,452
Issued: Jul. 18, 1995
Appl. No.: 08/146,053
Filed: Oct. 29, 1993

Certificate of Correction issued Oct. 17, 1995.

(22) PCT Filed: Apr. 15, 1992
(86) PCT No.: PCT/DE92/00318
§ 371 Date: Oct. 29, 1993
§ 102(e) Date: Oct. 29, 1993
(87) PCT Pub. No.: WO92/19893
PCT Pub. Date: Nov. 12, 1992

(30) Foreign Application Priority Data

Apr. 30, 1991 (DE) .................................. 41 14 114
Dec. 11, 1991 (DE) .................................. 41 40 833

(51) Int. Cl.$^7$ .......................................... F16J 15/16
(52) U.S. Cl. ........................ 277/589; 277/556; 277/565
(58) Field of Search ................................. 277/447, 448, 277/452, 453, 466, 468, 558, 579, 580, 581, 582, 587, 589

(56) References Cited

U.S. PATENT DOCUMENTS

| | | |
|---|---|---|
| 3,473,814 | 10/1969 | Bastow . |
| 3,614,114 | 10/1971 | Traub . |
| 3,663,024 | 5/1972 | Traub . |
| 3,999,767 | 12/1976 | Sievenpiper . |
| 4,523,765 | 6/1985 | Heidemann . |
| 4,909,520 | 3/1990 | Gallagher . |
| 5,618,046 * | 4/1997 | Binford .............................. 277/466 |

FOREIGN PATENT DOCUMENTS

| | | | |
|---|---|---|---|
| 1438619 * | 6/1976 | (GB) .................................. 277/165 |
| 1-75659 | 5/1989 | (JP) . | |

* cited by examiner

Primary Examiner—Daniel G. DePumpo

(57) ABSTRACT

A sealing device is arranged in a groove between a first machine component and a second machine component. If the sealing device, comprising the sealing ring and the biasing element, is subjected to a hydraulic pressure from the high pressure side and/or should an axial motion of a machine component take place, the sealing ring pivots towards the low pressure side in such a fashion that an angle α is reduced and an angle β is increased. Through this pivoting effect a sealing edge is formed. Thereby a wedge-shaped gap forms between the peripheral surface and the surface of the sealing ring lying across therefrom, the gap being open towards the low pressure side.

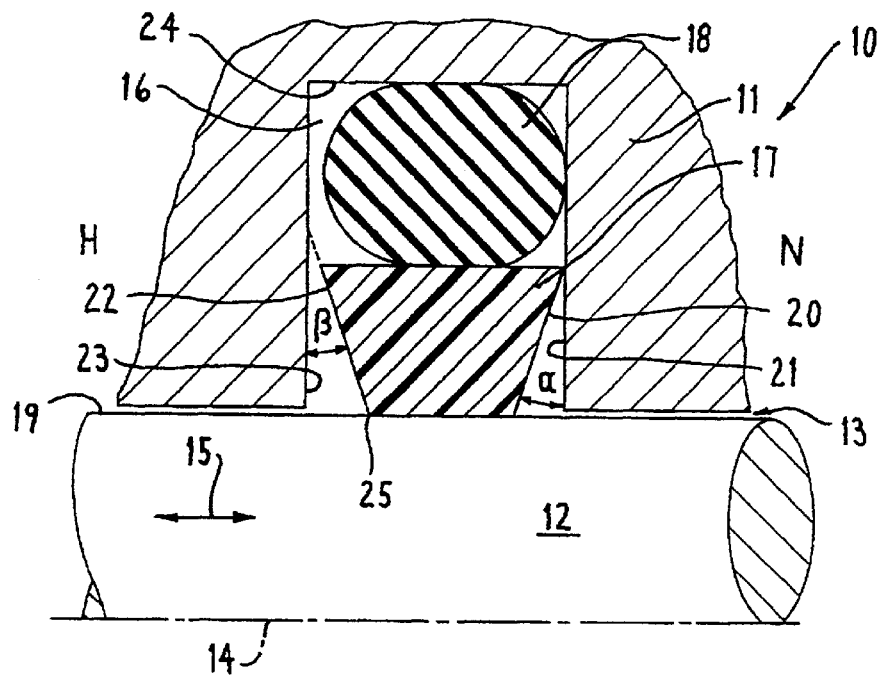

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–21 is confirmed.

New claims 22–30 are added and determined to be patentable.

*22. The sealing device of claim 1, wherein the sealing surface when the sealing ring seats on the second machine component, in the pressure-less state, is elongated along the peripheral surface generally parallel with the axis of the second machine component, and wherein the sealing edge of the sealing ring as engaged with the peripheral surface when the sealing ring is in the pressurized state is located adjacent one end of the sealing surface defined in the pressure-less state.*

*23. The sealing device of claim 1, wherein the sealing ring has a generally flat outer surface which is spaced radially from the sealing surface so as to be defined on a radially opposite face of the sealing ring, the biasing ring being disposed in contact with the flat surface for biasing the sealing ring radially toward the sealing surface, and in the pressure-less state the outer surface of said sealing ring where it contacts the biasing ring being generally radially aligned with the sealing surface.*

*24. The sealing device of claim 23, wherein the sealing ring is symmetrically configured in cross section when in the pressure-less state.*

*25. The sealing device of claim 1, wherein pressure loaded and unloaded surfaces as defined on the sealing ring adjust themselves relative to the sealing edge in accordance with the degree of tilt of the sealing ring.*

*26. The sealing device of claim 10, wherein the sealing surface when the sealing ring seats on the second machine component, in the pressure-less state, is elongated along the peripheral surface generally parallel with the axis of the second machine component, and wherein the sealing edge of the sealing ring as engaged with the peripheral surface when the sealing ring is in the pressurized state is located adjacent one end of the sealing surface defined in the pressure-less state.*

*27. The sealing device of claim 10, wherein the sealing ring has a generally flat outer surface which is spaced radially from the sealing surface so as to be defined on a radially opposite face of the sealing ring, the biasing ring being disposed in contact with the flat surface for biasing the sealing ring radially toward the sealing surface, and in the pressure-less state the outer surface of said sealing ring where it contacts the biasing ring being generally radially aligned with the sealing surface.*

*28. The sealing device of claim 27, wherein the sealing ring is symmetrically configured in cross section when in the pressure-less state.*

*29. The sealing device of claim 10, wherein pressure loaded and unloaded surfaces as defined on the sealing ring adjust themselves relative to the sealing edge in accordance with the degree of pivot of the sealing ring.*

*30. The sealing device of claim 21, wherein pressure loaded and unloaded surfaces as defined on the sealing ring adjust themselves relative to the sealing edge in accordance with the degree of pivot of the sealing ring.*

\* \* \* \* \*